United States Patent

Bunzemeier

[11] Patent Number: 5,796,608
[45] Date of Patent: Aug. 18, 1998

[54] SELF CONTROLLABLE REGULATOR DEVICE

[75] Inventor: Andreas Bunzemeier, Hahler Strasse, Germany

[73] Assignee: Hartmann & Braun A.G., Frankfurt, Germany

[21] Appl. No.: 676,051

[22] Filed: Jul. 5, 1996

[30] Foreign Application Priority Data

Jul. 6, 1995 [DE] Germany ............... 195 25 907.6

[51] Int. Cl.$^6$ .................. G05B 13/02; G05B 11/42
[52] U.S. Cl. .............. 364/157; 364/148; 364/149; 364/157; 364/161; 364/162
[58] Field of Search ............... 364/160–165, 364/149, 151, 157, 177, 148, 152, 176; 318/561, 610, 609; 395/520

[56] References Cited

U.S. PATENT DOCUMENTS

| | | | |
|---|---|---|---|
| 3,946,297 | 3/1976 | Bechtel | 318/609 |
| 4,354,224 | 10/1982 | Sato | 364/183 |
| 4,679,136 | 7/1987 | Shigemasa | 364/162 |
| 4,719,561 | 1/1988 | Shigemasa | 364/151 |
| 4,882,526 | 11/1989 | Iino et al. | 364/161 |
| 4,903,192 | 2/1990 | Saito et al. | 364/157 |
| 5,153,807 | 10/1992 | Saito et al. | 364/157 |
| 5,245,528 | 9/1993 | Saito et al. | 364/161 |
| 5,295,061 | 3/1994 | Katayama et al. | 364/157 |
| 5,347,446 | 9/1994 | Iino et al. | 364/149 |
| 5,477,449 | 12/1995 | Iino | 364/149 |

Primary Examiner—James P. Trammell
Assistant Examiner—Cuong H. Nguyen
Attorney, Agent, or Firm—Michael M. Rickin

[57] ABSTRACT

A self tuning control system and a method for tuning such a system. The system has a controller formed by a PI controller and a proportional control unit with a mixing point therebetween to which the absolute reference valve is connected. The system has another mixing point upstream of the controller to which the reference variable and the absolute reference valve are connected. The self tuning method involves two cycles. In the first cycle the control loop of the controller is closed only through the proportional control unit and the proportional component of the proportional control unit is determined. In the second cycle the control loop is closed through both the PI controller and the proportional control unit and the integral action time and proportional action coefficient of the PI controller are determined.

9 Claims, 2 Drawing Sheets

1

SELF CONTROLLABLE REGULATOR DEVICE

1. Field of the Invention

The invention relates to a self-tuning controlling system which has at least one integral-action component and is particularly suited for controlled systems without compensation and a method for self-tuning such a controlling system.

2. Description of the Prior Art

The term self-tuning controlling system as used here refers to both a so-called self-tuning controller which finds its optimum control parameters through a one-time adjustment process as well as an adaptive controller in which the control parameters are continually adjusted as a function of the changes in the process being controlled.

It is basically well known, for instance from "Messen Steuern Regeln für Maschinenbauer," |Measurement and Control for the Mechanical Engineer|, Walter Kaspers und Hans-Jürgen Küfner, Friedr. Vieweg & Sohn Verlagsgesellschaft mbH, Braunschweig, Germany, 1977, 1st edition, particularly p. 320, that pure integral-action controllers having controlled systems without compensation, integral-action systems, lead to structural instability. The cause for this structural instability is a dual pole location at the origin of the complex image plane for the open-loop transfer function which is transformed into the complex variable domain, the negative effect on the correction performance of which cannot be compensated by corresponding derivative-action components of the controller. Due to the requirement for stationary accuracy, the integral-action components cannot be dispensed with even if the controlled system itself exhibits integral action as described in W. Leonhard's "Einführung in die Regelungstechnik" [Introduction to Automatic Control Engineering], 3rd edition, Friedr. Vieweg & Sohn Verlagsgesellschaft mbH, Braunschweig, Germany, 1985.

Adding a proportional component to the controller results in what is referred to as a PI controller in which the adjustment to the process is carried out by means of the control parameters, proportional-action coefficient $K_p$ and integral-action time $T_n$.

Especially in the area of standard industrial controllers where the focus is on ease of system operation, near-universal applicability, and relatively low implementation costs, the choice frequently falls on self-tuning or adaptive controllers which derive their information on the process exclusively from the time characteristic of the system deviation. The actual adaptation principle is thereby based on direct evaluation of the time characteristic of the system deviation. If there are oscillations of the system deviation during the settling phase, the adaptation algorithm resets the control parameters such that the controller counteracts the oscillations. However, in order for this method to work, it is essential that there be a clear and, especially, an equidirectional relationship between the set control parameters and the characteristic transient response of the control loop, oscillating or aperiodic run-in to the set point.

With respect to such PI controllers, Bernd-Markus Pfeiffer concludes in his contribution "Selbsteinstellende Klassische Regler mit Fuzzy-Logik" [Self-tuning Conventional Controllers with Fuzzy Logic] in "at-Automatisierungstechnik" 42 (1994) 2, R. Oldenbourg Verlag, under reference to Test Process 10 from R. Isermann's "Digitale Regelsystem" |Digital Control Systems|, Vol. 1, 2nd edition, Springer-Verlag Berlin, 1988, that PI controllers for controlled systems of the type integrator of the 2nd order, so-called I–$T_1$ systems, are not suitable for automated system startup based on an algorithmic analysis of the time characteristic of the system deviation.

The reason for this is that with both very large and very small proportional-action coefficients $K_p$ of the PI controller, the oscillation tendency of the controlled variable increases and that it is not possible in this respect to give a clear rule in which direction the proportional-action coefficient $K_p$ needs to be changed to avoid instabilities.

A method to determine the control parameters has furthermore been disclosed wherein the controlled system is described by a model which simulates the properties of that controlled system. For the control of such controlled systems, "Rechnergestützte Optimierung statischer und dynamischer System" |Computer-aided Optimization of Static and Dynamic Systems|, Heinrich G. Jacob, Fachberichte Messen/Steuern/Regeln, Springer-Verlag, Berlin, Heidelberg, New York, 1982, provides a dynamic model of the controlled system which precisely simulates the behavior of such system at all its operating points. If an operating point changes, new control parameters describing that operating point are defined and set on the controller.

However, designing such a model is very costly and, furthermore, is explicitly restricted to controlled systems which have a fixed definition. Every change in the controlled system influences the system's behavior and must therefore be taken into account in the exact model. Especially for unique systems and systems that are continuously developing, the creation of an exact dynamic model is not appropriate.

The object of the invention therefore is to define by simple means a self-tuning controller having an integral-action component and a method for self-tuning this controller, such that the controller does not require a model and can be used in delay systems without compensation.

SUMMARY OF THE INVENTION

The heart of the invention consists of the assignment to a PI controller known in the art a structural element which selectively shifts one of the two pole locations from the origin to the left s-half plane of the complex image plane for the open-loop transfer function which is transformed into the complex variable domain such that for small proportional-action coefficients, a real value pole distribution is always obtained, thereby forcing an aperiodic transient response.

This structural element is formed by a proportional control unit which is connected to the PI controller downstream in the sequence, with a mixing point being provided between the PI controller and the proportional control unit to compare the output signal of the PI controller with the controlled variable. The time response of the control loop which is closed via this proportional control unit is determined by the control parameter feedback factor $K_r$.

Starting with the transfer function of the open-loop comprising a PI controller and a I–$T_n$ controlled system, $$G_0(s) = K_P \frac{1+sT_n}{sT_n} \cdot \frac{1}{sT_I \cdot \prod_{k=1}^{n}(1+sT_k)}$$

the transfer function of the extended open-loop comprising a PI controller, a linked proportional control unit according to the invention, and a I–$T_n$ controlled system, $$G_0(s) = K_p \frac{1+sT_n}{sT_n} \cdot \frac{1}{1+s\frac{T_l}{K_r} \cdot \prod_{k=1}^{n}(1+sT_k)}$$

The environment of the PI controller now appears as a P-$T_{n+1}$ controlled system, the amplification of which is always exactly one. This arrangement has the advantage that there is an equidirectional relationship between the feedback factor $K_r$ and the corresponding transient response; the oscillation tendency increases with increasing feedback factor $K_r$ such as to permit automatic adjustment of such control-loops.

DESCRIPTION OF THE DRAWING

The invention is further explained below by means of an exemplary embodiment. The corresponding drawing figures show.

DESCRIPTION OF THE PREFERRED EMBODIMENT(S)

Figure 1:
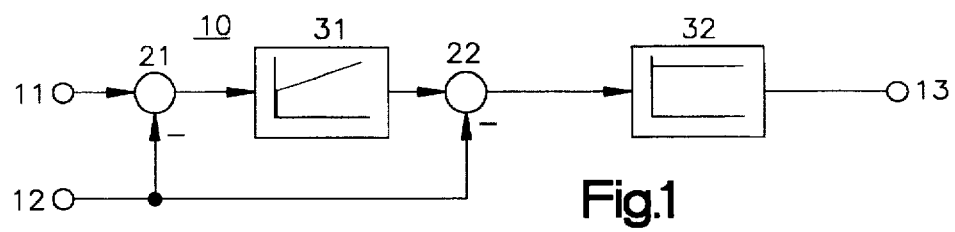
FIG. 1, a structural diagram of a self-tuning controlling system

FIG. 1 shows the principle of a self-tuning controlling system 10 comprising a PI controller 31 with a proportional and an integral-action component wherein a reference input variable 11 and an absolute reference value 12 are joined at a mixing point 21 which is upstream from PI controller 31, which mixing point 21 is designed as a subtraction point. The absolute reference value 12 is the measured value from the process controlled by the controlling system 10 and is usually obtained by a feedback loop (not shown). In accordance with the present invention a proportional control unit 32 is connected along the sequence downstream from PI controller 31 and a mixing point 22 being provided between PI controller 31 and proportional control unit 32. The second mixing point 22 is designed as a subtraction point in which the output signal of PI controller 31 is combined with absolute reference value 12.

Figure 2:
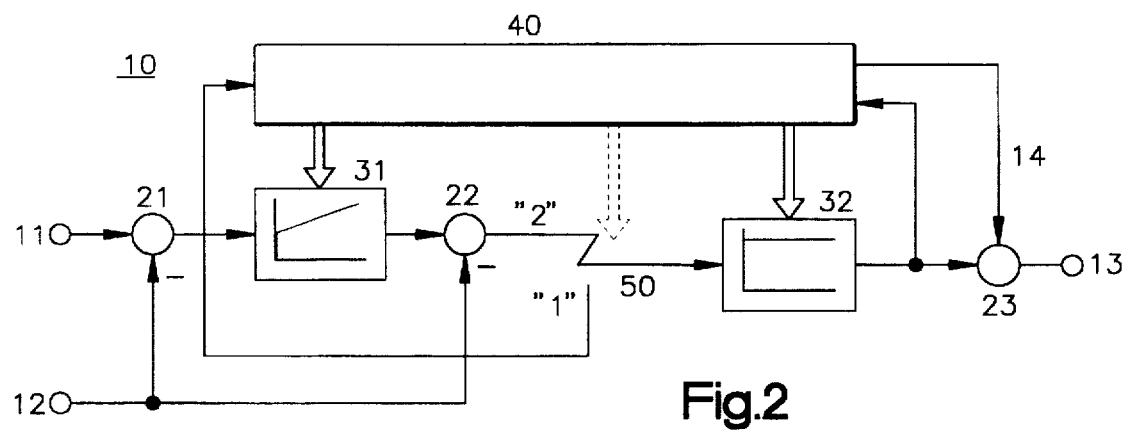
FIG. 2, a structural diagram of a controlling system with adaptation unit

To adjust a controlling system 10 according to FIG. 1, a changeover unit 50 is provided, as shown in FIG. 2, between the second mixing point 22 and proportional control unit 32 such that the input of proportional control unit 32 can optionally be combined either with the second mixing point 22 or with the input of PI controller 31.

For automatic adjustment of the controlling system, an adaptation unit 40 is provided with a first signal input which is parallel to the input of PI controller 31, a second signal input which is parallel to the output of proportional control unit 32, means to influence the position of changeover unit 50, means to influence the control parameters $K_p$ and $T_n$ of PI control 31 and proportional control unit 32, and an output for a compensation value 14 to compensate static disturbance before the integral-action system.

In addition, a third mixing point 23 is provided to combine the output signal of proportional control unit 32 with compensation value 14 from adaptation unit 40 to give manipulated variable 13. The third mixing point 23 is designed as a summing point. This has the advantage that it makes it possible to compensate disturbances which act before the integral-action system and result in increasing system deviation over time by compensation value 14 which is equal in amount but has a complementary sign without having to intervene in the controlling system itself.

As is well known, for instance from the middle figure shown at the top of page 286 of Winfried Oppelt's "Kleines Handbuch technischer Regelvargeinge" |Small Handbook of Technical Control Processes|, Verlag Chemie, Germany, 1960, a PI control 31 can be extended by a derivative unit to form a PID controller. This makes it possible, in addition to the above mentioned advantages, further to improve the control-loop's response to setpoint changes by compensating the conjugate complex pole pair that was created by the feedback loop with the zero coefficients of the D-component. It is not necessary to show figures corresponding to FIGS. 1 and 2 wherein a PID controller is used instead of PI controller 31 as those figures would be identical to FIGS. 1 and 2 except that controller 31 would be a PID controller instead of a PI controller.

Two consecutive cycles are provided to self-tune the controlling system 10 of FIG. 2 in the context of an automated system startup. For this purpose, the setpoint of the closed-loop control is abruptly reset several consecutive times and the required correction of the control parameters is determined based on the respective qualitative characteristic of the system deviation which can be aperiodic or oscillating. The self-tuning process is concluded when the control parameters no longer change significantly from one correction process to the next.

With reference to FIG. 2, during the first cycle, the control-loop is closed exclusively via proportional control unit 32, the proportional component of proportional control unit 32 in the form of feedback factor $K_r$ is reset step-wise from a presettable starting point according to a prespecifiable algorithm until the overshoot of manipulated variable 13 falls just below a preset limit, and the feedback factor $K_r$ thus determined is held.

Figure 4:
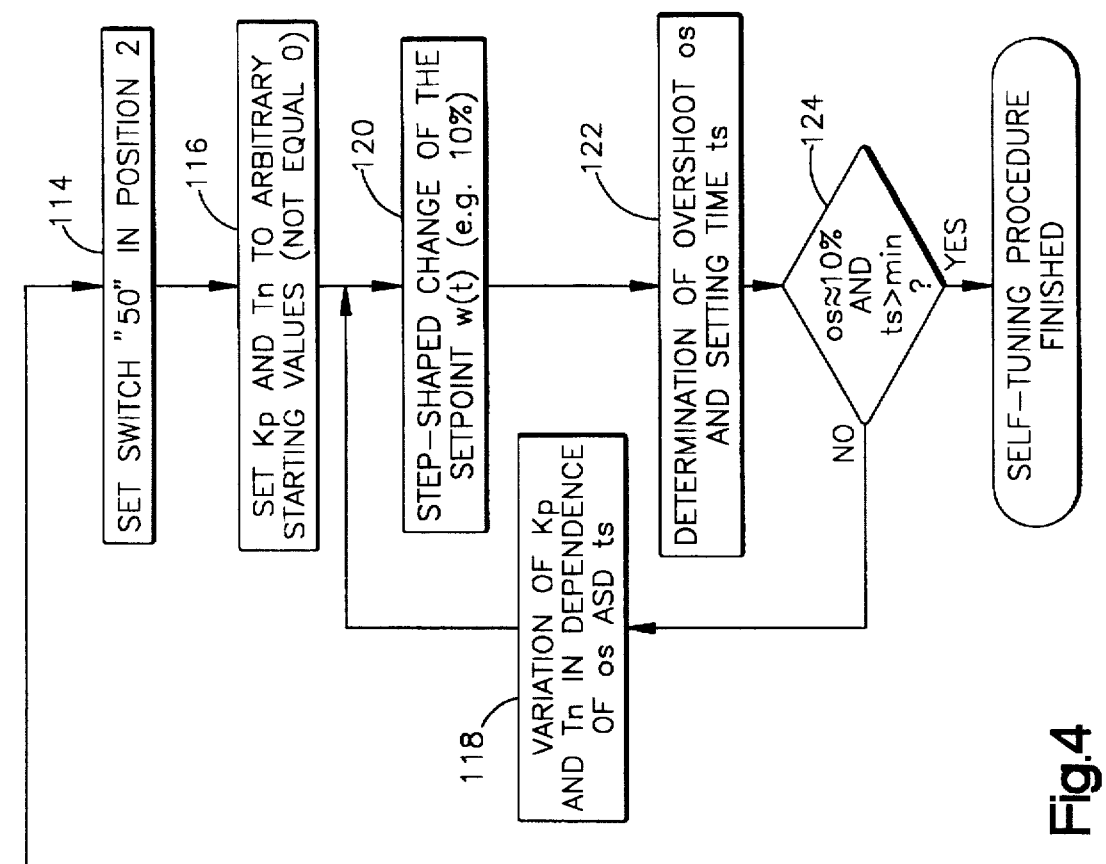
FIG. 4, a flowchart of the algorithm used in the adaptation unit of the controlling system of FIG. 2.
Figure 4:
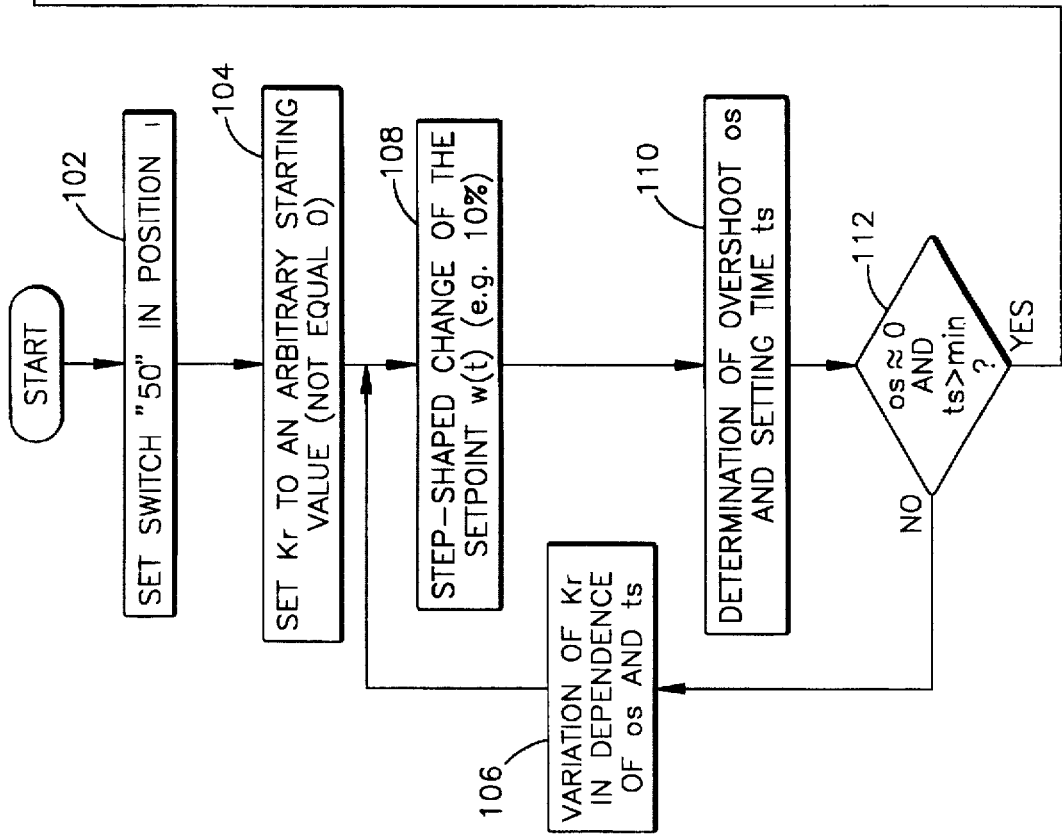

Specifically, and is shown in the flowchart of FIG. 4 changeover unit 50 is brought to position "1" in step 102 and, starting with a presettable starting value in step 104, the feedback factor $K_r$ is adjusted step-wise in step 106 by means of the adaptation unit such that manipulated variable 13, upon an abrupt setpoint change in step 108, returns as quickly as possible but without major overshoot to its original position (overshoot and settling time are determined in step 110 and step 112 determines if the loop of steps 106, 108 and 110 must be repeated again or if the first cycle is completed).

Since this one-dimensional optimization requires a low degree of accuracy, three to five correction processes are sufficient depending on the starting value and the efficiency of the prespecifiable algorithm which is the basis of the adaptation process. The feedback factor $K_r$ is then determined.

In a second cycle, the control-loop is then closed via the entire controlling system, starting with presettable starting values which reset step-wise the integral-action time $T_n$ and the proportional-action coefficient $K_p$ of PI controller 31 according to a prespecifiable algorithm until the overshoot amplitude and the transient recovery time meet predetermined specifications, and the proportional-action coefficient $K_p$ and integral-action time $T_n$ thus determined are held.

Specifically and as shown in the flowchart of FIG. 4, the changeover unit 50 is brought to position "2." To determine the integral-action time $T_n$ and the proportional-action coefficient $K_p$ of the PI controller 31 as such, methods known in the art can be used. These methods are shown in steps 116, 118, 120, 122 and 124 which are substantially identical to step 104, 106, 108, 110 and 112, respectively described above except that in the second cycle the overshoot has to be about 10% (see step 124) as compared to an overshoot of about zero in the first cycle (see step 112).

By means of the exemplary embodiment below, the principle control-dynamic properties of the controlling system according to the invention are compared to those of a PI controller according to prior art.

Considered, first, is an I-$T_1$ controlled system with the transfer function $$G_s(s) = \frac{1}{sT_f(1 + sT_1)}$$

where $T_f$=25s and $T_1$=5s.

For a phase margin of $\phi_{R1}$=70°, which results in a nearly aperiodic transient response, a feedback factor $K_r$=1.94 is determined. The reciprocal value of the angular frequency, for which the absolute frequency response of the control loop closed via feedback factor $K_r$, fell by 3 dB compared to the starting value, for the integral-action time results in $T_n$=9.27s. The proportional-action coefficient $K_p$ of the PI controller is fixed such that, with a phase margin of $\phi_{R2}$=60°, there is approximately 10% overshoot in the response to setpoint changes, with $K_p$=0.86.

For comparison, a conventional PI controller was designed according to the "method of the symmetrical optimum," wherein the control parameters, as is generally known, are selected exactly so that the gain crossover frequency coincides with the frequency of the phase maximum thus permitting an adequately dampened transient response. To obtain a good disturbance response, a phase margin of $\phi_R$=40° is specified such that the proportional-action coefficient results as $K_p$=2.33 and the integral-action time as $T_n$=23s.

Figure 3A:
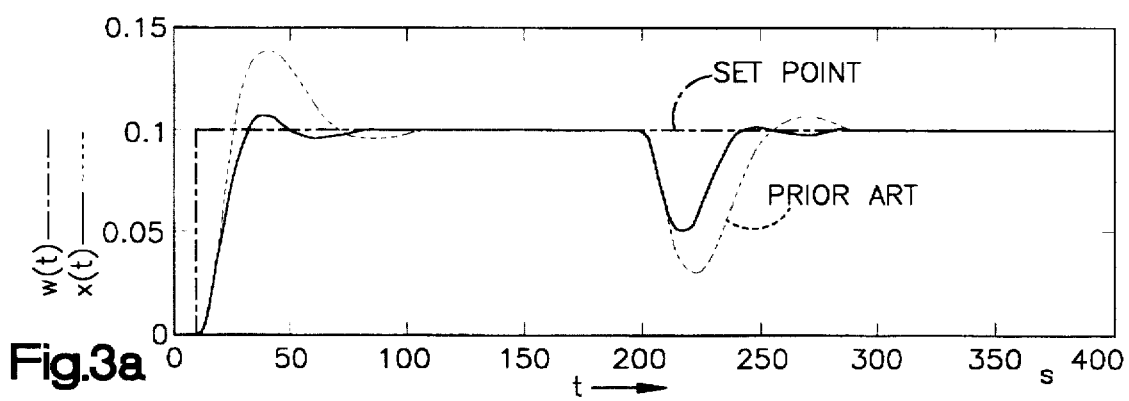
FIG. 3, a comparison of this type of control with the prior art.
Figure 3B:
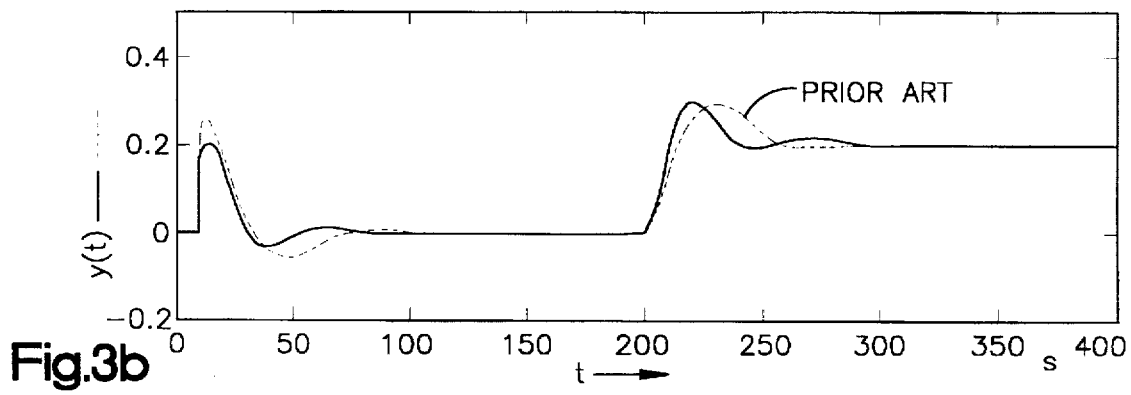

FIG. 3 compares the control-dynamic properties of a controlling system according to the invention with those of a PI controller according to prior art having the above specified control parameters. Specifically, FIG. 3a shows the response to setpoint changes and FIG. 3b the disturbance step response for a disturbance of $z(t)=0.2\sigma(t-200)$, whereby the time characteristics for the controlling system according to the invention are shown as solid lines and the time characteristics for the PI controller according to prior art as dotted lines. As is shown in FIG. 3a, the setpoint, see the dashed and dotted line, changes from 0.0 to 0.1 (the scale is normalized). The response of the absolute reference value of a PI controller system in accordance with the prior art is shown by the dotted line and the response of the absolute reference value of a PI controller system embodied in accordance with the present invention. FIG. 3b shows the response of the absolute reference value to a disturbance, in the form of jump with a normalized amplitude of 0.2, which occurs at a time of 200 seconds in a PI controller system embodied in accordance with the prior art (dotted line) and in a PI controller system embodied in accordance with the present invention (solid line).

The controlling system according to the invention, based on its phase increase in the frequency range of interest, exhibits clear advantages in its response to setpoint changes and disturbances. As shown in FIG. 3a, with setpoint changes w(t), the overshoot of controlled variable x(t) is significantly smaller despite a shorter response time. Analogously to FIG. 3a, FIG. 3b shows the quicker response to the new setpoint for a comparable range of setpoints y(t).

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for self-tuning of a controlling system that provides at its output a manipulated variable, said system comprising a first controller having a selectably closeable control loop and a first mixing point upstream from said first controller whereat a reference input variable and an absolute reference input variable are joined, said first controller comprising a second controller, a proportional control unit and a second mixing point between said second controller and said proportional control unit to which said absolute reference value is connected, said second controller having at least an integral action time and a proportional action coefficient, said proportional control unit having a proportional component, said method comprising the steps of:

in a first cycle,
  closing said control loop by only said proportional control unit,
  adjusting said proportional component stepwise from a presettable starting value until the overshoot of said manipulated variable falls just below a preset limit, and
  holding said proportional component at said value whereat said manipulated variable overshoot falls just below said preset limit; and in a second cycle,
  closing said control loop by said second controller and said proportional control unit,
  adjusting said integral action time and said proportional action coefficient stepwise until the overshoot amplitude and the transient recovery time of said manipulated variable both meet predetermined specifications, and
  holding said integral action time at said time and said proportional action coefficient at said coefficient whereat said manipulated variable overshoot amplitude and transient recovery time both meet said predetermined specifications.

2. A self-tuning controlling system comprising:
  a) a first controller formed by a ladder network comprising:
    i) a second controller having at least a proportional unit and an integral-action unit; and
    ii) a proportional control unit;
  b) a first mixing point which is upstream from said first controller whereat a reference input variable and an absolute reference value are joined; and
  c) a second mixing point between said second controller and said proportional control unit, said absolute reference value also connected to said second mixing point.

3. The controlling system according to claim 2 wherein said second controller and said proportional control unit both have an input and said controlling system further comprises a changeover unit connected between said second mixing point and said proportional control unit such that said proportional control unit input can optionally be connected with said second mixing point and with said second controller input.

4. The controlling system according to claim 3 wherein said proportional control unit has an output and said controlling system further comprises an adaptation unit which comprises:

i) a first signal input which is parallel to said second controller input;

ii) a second signal input which is parallel to said proportional control unit output;

iii) means to influence the position of said the changeover unit;

iv) means to influence the control parameters of said second controller and said proportional control unit; and v) an output for a compensation value to compensate static disturbances before said second controller.

5. The controlling system according to claim 4 further comprising a third mixing point to combine the output signal of said proportional control unit with said compensation value to thereby generate a manipulated variable.

6. The controlling system according to claim 5 wherein said second controller also has a derivative unit.

7. The controlling system according to claim 2 wherein said second controller also has a derivative unit.

8. The controlling system according to claim 3 wherein said second controller also has a derivative unit.

9. The controlling system according to claim 4 wherein said second controller also has a derivative unit.

* * * * *